(12) United States Patent
Bergqvist et al.

(10) Patent No.: US 12,047,828 B2
(45) Date of Patent: Jul. 23, 2024

(54) ALIGNED CONFIGURATION FOR RANDOM ACCESS CHANNEL-LESS HANDOVER/SECONDARY CELL GROUP CHANGE

(71) Applicant: Telefonaktiebolaget LM Ericsson (PUBL), Stockholm (SE)

(72) Inventors: Jens Bergqvist, Linköping (SE); Johan Rune, Lidingö (SE); Oscar Ohlsson, Bromma (SE); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 358 days.

(21) Appl. No.: 17/429,692

(22) PCT Filed: Feb. 13, 2020

(86) PCT No.: PCT/IB2020/051213
§ 371 (c)(1),
(2) Date: Aug. 10, 2021

(87) PCT Pub. No.: WO2020/165841
PCT Pub. Date: Aug. 20, 2020

(65) Prior Publication Data
US 2022/0110037 A1    Apr. 7, 2022

Related U.S. Application Data

(60) Provisional application No. 62/805,117, filed on Feb. 13, 2019, provisional application No. 62/805,686, filed on Feb. 14, 2019.

(51) Int. Cl.
*H04W 36/08* (2009.01)
*H04W 36/00* (2009.01)
*H04W 72/23* (2023.01)

(52) U.S. Cl.
CPC ....... *H04W 36/08* (2013.01); *H04W 36/0072* (2013.01); *H04W 72/23* (2023.01)

(58) Field of Classification Search
CPC .. H04W 36/08; H04W 36/0072; H04W 72/23
See application file for complete search history.

(56) References Cited

U.S. PATENT DOCUMENTS

| 2012/0002643 A1* | 1/2012 | Chung | H04W 36/0072 370/331 |
|---|---|---|---|
| 2018/0049079 A1 | 2/2018 | Ozturk et al. | |

(Continued)

FOREIGN PATENT DOCUMENTS

| CN | 107409336 A | 11/2017 |
|---|---|---|
| WO | WO2018031110 A1 | 2/2018 |

(Continued)

OTHER PUBLICATIONS

3GPP TSG-RAN WG2 #97; Athens, Greece; Source: Ericsson; Title: Trigger to stop T304/T307 at RACH-less procedure with dynamic UL grant (Tdoc R2-1701551)—Feb. 13-17, 2017.

(Continued)

*Primary Examiner* — Rina C Pancholi
(74) *Attorney, Agent, or Firm* — Baker Botts L.L.P.

(57) ABSTRACT

A process allows a UE to acquire a System Frame Number (SFN) before accessing a target base station/node during a RACH-less handover. The SFN may be provided to the UE in various ways. For example, the SFN may be provided as part of a handover command message (e.g., RRCReconfiguration) or a master information block (MIB). In this manner, the UE acquires the SFN before accessing the target base station/node, which allows the target base station/node and the UE to effect certain timings for the handover. For example, the target base station/node and the UE may set (Continued)

---

1102
Read a SFN for a target cell from a MIB or PBCH in the target cell OR receive the SFN from a source node.

1104
Access the target cell at a RACH-less handover or SCG change according to the SFN.

time bounds in which the handover must occur. As another example, different types of uplink grants may be set.

12 Claims, 12 Drawing Sheets

(56) References Cited

U.S. PATENT DOCUMENTS

2018/0332507 A1* 11/2018 Fujishiro .................. H04J 11/00
2019/0110300 A1*  4/2019 Chen ........................ H04B 7/00

FOREIGN PATENT DOCUMENTS

WO      2018 067063 A1    4/2018
WO    WO-2018067063 A1 *  4/2018  ........ H04W 36/0072

OTHER PUBLICATIONS

3GPP TSG-RAN WG2 #97bis; Spokane, US; Source: Huawei, HiSilicon; Title: Close to 0 ms HO interruption time for single Tx/Rx UE (R2-1703382)—Apr. 3-7, 2017.
PCT International Search Report issued for International application No. PCT/IB2020/051213—May 12, 2020.
PCT Written Opinion of the International Searching Authority issued for International application No. PCT/IB2020/051213—May 12, 2020.

* cited by examiner

ALIGNED CONFIGURATION FOR RANDOM ACCESS CHANNEL-LESS HANDOVER/SECONDARY CELL GROUP CHANGE

PRIORITY

This nonprovisional application is a U.S. National Stage Filing under 35 U.S.C. § 371 of International Patent Application Serial No. PCT/IB2020/051213 filed Feb. 13, 2020 and entitled "ALIGNED CONFIGURATION FOR RANDOM ACCESS CHANNEL-LESS HANDOVER/SECONDARY CELL GROUP CHANGE" which claims priority to U.S. Provisional Patent Application No. 62/805,117 filed Feb. 13, 2019 and U.S. Provisional Patent Application No. 62/805,686 filed Feb. 14, 2019 all of which are hereby incorporated by reference in their entirety.

TECHNICAL FIELD

The present disclosure relates, in general, to wireless communications and, more particularly, to handover in a wireless network.

BACKGROUND

Random Access Channel (RACH)-less handover (HO) and RACH-less secondary cell group (SCG) change have been specified for Long-Term Evolution (LTE), as part of 3GPP Release 14, to decrease the interruption time at handover and SCG change, respectively. The RACH-less handover procedure means that no Msg1 transmission (e.g., RACH preamble transmission) by the user equipment (UE) or Msg2 transmission (e.g., network responding with Random Access Response message) are performed when accessing the target cell during the handover.

Through Msg2, the network provides the UE with an uplink (UL) grant for transmission of more information to the network, in a so called Msg3. Msg1, among others, is used by the network to determine a Timing Advance (TA) value that the UE should use in its uplink transmissions for the transmissions to reach the network at the appropriate point in time (e.g., a point in time related to when the UE receives downlink transmissions from the cell). This TA value is mainly dependent on the distance from the UE and the base station/antenna, and the initial value to use is signaled to the UE in Msg2.

At a RACH-less handover/SCG change, the UE is instead provided with a TA value prior to accessing the target cell. For the Msg3 message to reach the target node at the appropriate point in time, the correct TA value to use for the UE in the target cell should be known in advance. The use of RACH-less handover/SCG change is thus restricted to cases where:
- the target cell is known to have the same TA value as another cell where the UE already has a connection and thus a known TA value (such as a PCell, PSCell or SCell) when the handover is initiated; or
- the target cell is known to have a TA value=0 (e.g., it is a small cell).

The UL grant for Msg3 transmission in the target cell at a RACH-less handover/SCG change can be provided to the UE in two different ways:
- The UL grants can be pre-allocated to the UE in the HO Command message (e.g., within the RRCConnectionReconfiguration message) instructing the UE to perform the handover or SCG change.
- The target cell can schedule the UE with UL grants (e.g., physical uplink shared channel (PUSCH) resources) using the physical downlink control channel (PDCCH). The UE is then scheduled through the PDCCH using the C-RNTI that the UE has been configured with in the target cell.

To pre-allocate the UL grants, the target node configures UL grants (e.g., PUSCH resources) to the UE in advance, meaning that those resources cannot be allocated to any other UE. This may be problematic at high load scenarios or if several RACH-less handover/SCG changes are to be performed simultaneously. On the other hand, scheduling the UE in the target cell gives more flexibility for the target node in its resource allocation, but it uses an additional PDCCH resource in the target cell for each UL grant and it imposes an additional delay compared to the pre-allocation alternative. The additional delay results from a delay between the reception of the PDCCH scheduling in the target cell until the presence of the scheduled UL grant (e.g., PUSCH resource).

Pre-allocating UL grants to the UE means that the UE can access the target cell at the first UL grant that is available (e.g., pre-allocated) for it when it is ready for transmission in the target cell (e.g., after downlink synchronization and tuning towards the target cell). The typical delay until the first available UL grant then depends on the frequency of the pre-allocated UL grants. Three different periodicities have been specified for the pre-allocated UL grants: every 2nd, every 5th or every 10th subframe, where a subframe corresponds to 1 millisecond.

In both schemes (e.g., pre-allocation and scheduling) the target node does not know exactly when the UE will enter the target cell at the handover, because the RRCConnectionReconfiguration message is transmitted to the UE through the source cell, which may be handled by a different node. In addition, the UE may not acknowledge the reception of the RRCConnectionReconfiguration message at the handover, so the network may not know when the UE successfully received the message. The RRCConnectionReconfiguration message may be transmitted several times by the source node to increase the likelihood that the UE receives it.

The RACH-less configuration is valid until successful completion of the handover or SCG change, or until expiry of timer T304 or T307, respectively. Timer T304 and T307, respectively, are started by the UE when it receives a RRCConnectionReconfiguration message instructing it to perform a handover or SCG change. As a result, the UE that is configured with pre-allocated UL grants will consider itself to have received UL grants for that time. If the UE receives a RACH-less configuration with the PDCCH scheduling alternative, it will instead monitor the PDCCH for UL grant scheduling during the same time period.

At a handover in LTE, the UE may not read the System Frame Number (SFN) of the target cell before accessing the target cell. This feature is described in a note in sub-clause 5.4.2.3 in 3GPP Technical Specification 36.331 (version 15.4.0): "NOTE 2: The UE is not required to determine the SFN of the target PCell by acquiring system information from that cell before performing RACH access in the target PCell."

In new radio (NR), the UE should acquire the master information block (MIB) of the target cell to get timing information if the UE should perform a random access in that cell, unless the UE already has acquired the timing information. This is described in sub-clause 5.3.5.5.2 in 3GPP Technical Specification 38.331 (version 15.4.0):

"1> acquire the MIB, which is scheduled as specified in TS 38.213 [13];
1> perform the actions specified in clause 5.2.2.4.1;
NOTE 1: The UE should perform the reconfiguration with sync as soon as possible following the reception of the RRC message triggering the reconfiguration with sync, which could be before confirming successful reception (HARQ and ARQ) of this message.
NOTE 2: The UE may omit reading the MIB if the UE already has the required timing information, or the timing information is not needed for random access."

RACH-less HO/SCG change has not been standardized for NR, but this can be expected to be done in coming releases of the standard and it can be expected to use the corresponding LTE mechanism as the baseline.

There currently exist certain challenge(s). The RACH-less handover/SCG change described above assumes that the UE and the target node are aligned within the radio frames (e.g., where each subframe (0-9) within a radio frame starts), but not on the radio frame level. There is thus no alignment on what specific radio frame (in terms of System Frame Number (SFN)) that occurs at a specific point in time. In LTE, the UE typically acquired this information after the handover has completed.

As a result, the UE has no knowledge of the system timing (even if it has some knowledge of the more fine-grained timing of the subframe borders). In the case of pre-allocated UL grants, the UL grants should be consistent (e.g., have the same periodicity and size) during the whole validity of the RACH-less configuration. There are thus no time-dependent UL grants (e.g., different UL grants in different parts of a time period) defined for RACH-less handover or SCG change. It is thus not possible to configure the initial pre-allocated UL grants with a more aggressive coding scheme, which works for most scenarios, and later UL grants with a more robust one, adopted for the worst cases. Instead, the network may pre-allocate the UL grants in a manner that is adopted for the worst case during the whole RACH-less configuration. The periodicities of the pre-allocated UL grants are set such that the UL grants occur at the same location(s) within the radio frame. Thus, there are several periodicities for pre-allocated UL grants that cannot be used, such as every 3rd subframe, which could be more suitable for the target node to achieve lower interruptions at high load scenarios or when there are several simultaneous RACH-less handovers/SCG changes to the same target cell.

Because the target node does not know when the UE receives the RRCConnectionReconfiguration message (that triggers the HO/SCG change), it keeps pre-allocated UL grants reserved for the UE from the first possible point in time where the UE may have managed to enter the target cell (and be ready to transmit in the UL) at the handover/SCG change. How long it takes until the UE has managed to enter the target cell (for uplink transmission) depends on several different factors, such as how long time it takes for the source node to successfully transmit the RRCConnection-Reconfiguration message to the UE, how long time it takes for the UE to process the RRCConnectionReconfiguration message after it has received it, and how long time it takes to perform downlink (DL) synchronization and to retune to the target cell. If the target node does not consider the UL grants as reserved to the UE when the UE enters the target cell for UL transmission, the UE's transmissions may collide with transmissions performed by other UEs. If the target node considers UL grants as reserved to the UE before it has entered the cell for uplink transmission, those UL grants may be wasted.

Because the target node does not know when the UE successfully received the RRCConnectionReconfiguration message (that triggers the HO/SCG change), it does not know when the UE started timer T304 or T307. The target node also does not know when the timer expires in the UE (e.g., when there is a problem with the uplink transmission in the target cell), leading to failure of the handover or SCG change procedure. As a result, the target node may keep UL grants reserved for the UE until a latest possible point in time where T304 or T307, respectively, expires in case of failed handover/SCG change.

SUMMARY

Certain aspects of the present disclosure and their embodiments may provide solutions to these or other challenges. The proposed solution includes the UE acquiring the target cell SFN (through the physical broadcast channel (PBCH)/MIB acquisition in the target cell) prior to accessing the target cell at a RACH-less handover or SCG change. The target cell SFN value then is used for configuration of the validity of the RACH-less configuration. The validity of the RACH-less configuration can then include a starting point in time and an ending point in time for pre-allocated UL grants (e.g. PUSCH resources) in the target cell, as well as a starting point in time and an ending point in time for when the UE monitors the target cell for PDCCH scheduling of UL grants (e.g. allocation of PUSCH resources). It is also contemplated to use the target cell SFN value to determine the position of each pre-allocated UL grant when the pre-allocated UL grants have a periodicity that leads to different positions in different radio frames.

The solution also contemplates that the characteristics (or different parameters) of the pre-allocated UL grants can be altered during the validity period of the RACH-less configuration for the same RACH-less handover or SCG change. The characteristics can then be configured to be changed at one of several specific point(s) in time (e.g. at specific SFN value(s)). As an alternative, the characteristics may change according to a defined or configured pattern. Examples of such characteristics (or parameters) may include e.g.:
  the periodicity of the pre-allocated UL grants
  the size of each pre-allocated UL grant
  the modulation and coding scheme used for each pre-allocated UL grant.

The change in characteristics during the validity period of the RACH-less configuration may also include a change in power level that the UE uses, or can use, when it is transmitting in the UL grants. The UE can then be configured to increase the used power level in later transmissions if the first ones are unsuccessful.

As an alternative, the UE receives the target cell SFN value, which the UE then uses for time-dependent pre-allocated UL grants and/or RACH-less configuration, through a message received from the source node. The target cell SFN may then be based on SFN difference information maintained in the network nodes.

The solution may be summarized as:
1. The UE acquires knowledge of the SFN values in the target cell. To achieve this, the UE may read the SFN from the MIB/PBCH in the target cell or receive the information in a message from the source node. The information has the form of SFN and timing difference information between the target cell and the source cell.
2. The network utilizes the fact that the UE has full information about the timing (including SFN and subframe/ slot and symbol timing) of the target cell to provide the UE with time dependent configuration for RACH-less HO/SCG change. This may include a time period during which pre-allocated UL grants or PDCCH monitoring occasions are valid and/or specific points in time when the configuration should change (e.g., in terms of periodicity or time allocation pattern or, in case of pre-allocated UL grants, allocated transport block size and/or modulation and coding scheme (MCS)).

There are, proposed herein, various embodiments which address one or more of the issues disclosed herein. In a first embodiment, a user device (UE) receives a system frame number (SFN) of a target cell. The UE may read the SFN from the master information block (MIB) or physical broadcast channel (PBCH) in the target cell. The UE may receive the SFN in a message from a source node of a source cell. That message may include the SFN and timing difference information between the target cell and the source cell. In a second embodiment, a network node of a target cell transmits to a UE time dependent configuration for random access channel (RACH)-less handover (HO) or secondary cell group (SCG) change. The UE may have received an SFN of the target cell from a source node. The configuration may specify a time period during which pre-allocated uplink (UL) grants or physical downlink control channel (PDCCH) monitoring occasions are valid. The configuration may also specify specific points in time when the configuration should change. These points in time may be expressed in terms of periodicity, time allocation pattern, allocated transport block size, and/or modulation coding scheme (MCS).

Certain embodiments may provide one or more of the following technical advantage(s). The proposed solution avoids situations where the UE considers UL resources to be (pre-) allocated to the UE in the target cell although the target node does not expect any transmission from that UE and may even have allocated the same UL resource to another UE. The alignment also avoids the situation where the target node needs to reserve additional UL resources for a UE configured with a RACH-less HO/SCG change as a safety precautions to avoid the same problem, which may lead to UL transmission resources being allocated in vain for a UE that is not ready or prepared to use them.

The proposed solution allows time-dependent UL grants (e.g., UL grants whose properties may change during the allocation period) with one set of properties in the beginning of the period and another set of properties at the end of the period. For instance, pre-allocated UL grants for RACH-less HO/SCG change may have more aggressive coding schemes, which works for most scenarios, initially during the handover period and then a more robust one, adapted for the worst cases, after some time. This allows for use of more resource efficient UL grants in many of the RACH-less handovers/SCG changes. The solution also allows periodicities for pre-allocated UL grants that can be more suitable for the target node to achieve shorter interruptions at high load scenarios or when there are several simultaneous RACH-less handovers/SCG changes to the same cell.

The proposed solution also allows the network to configure the UE with a lower power level to use for the Msg3 transmission in the target cell, by supporting an increase in power level in case those first transmissions are not successful. This allows for use of lower power levels in many scenarios and thus a lower interference level.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
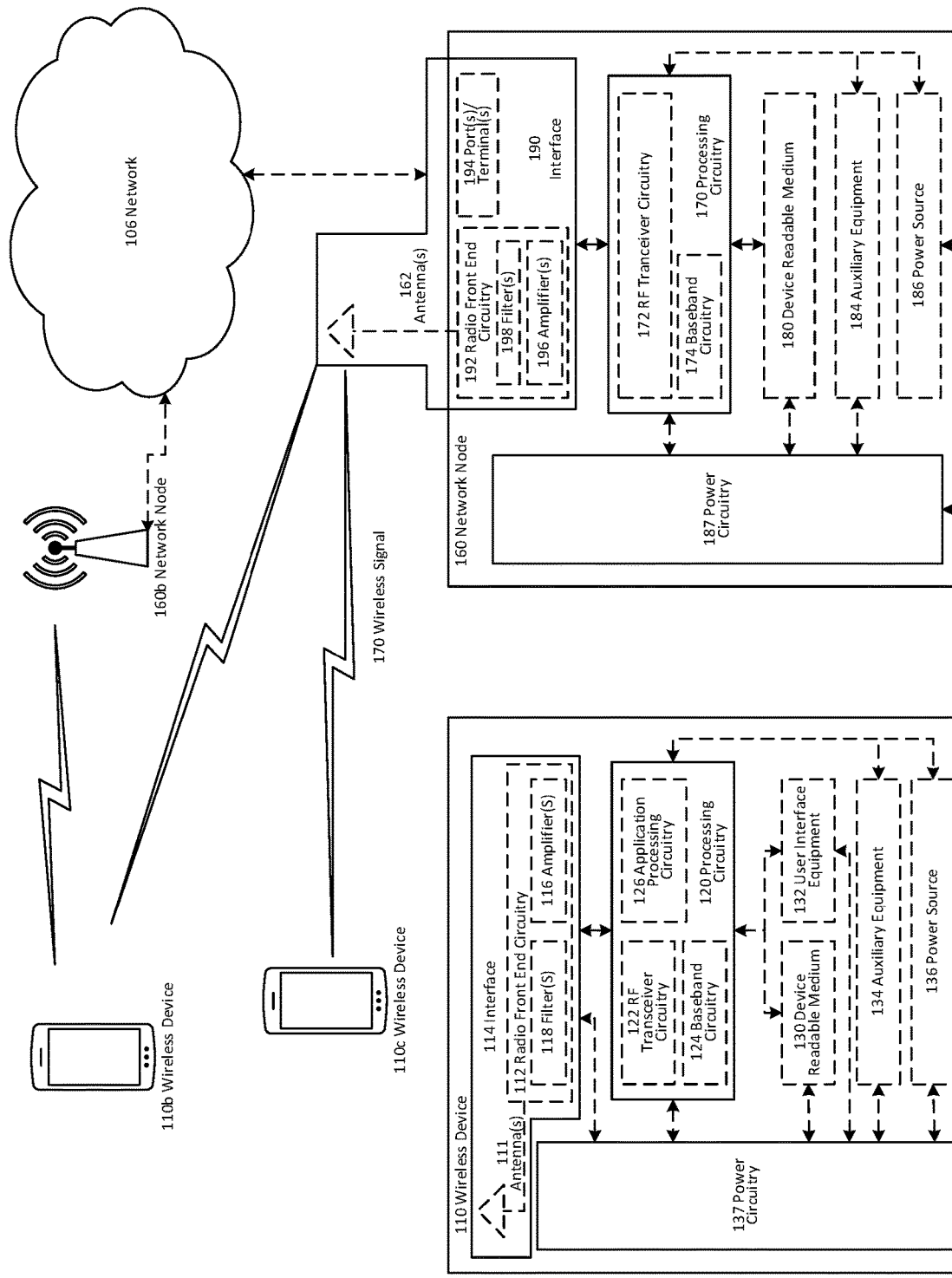
FIG. 1 is an illustration of an exemplary wireless network, in accordance with certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In existing telecommunications networks, a user equipment (UE) may perform a handover procedure to connect to base stations in different cells. One type of handover is a RACH-less handover in which no Msg1 or Msg2 transmissions occur during the handover. As a result, the UE is not provided a system frame number (SFN) of a target base station/node. Additionally, a target base station/node does not know when the UE will start or complete the handover and cannot set suitable start or stop times for the handover. Consequently, the target base station/node has to keep resources available for the UE until the handover either completes or fails, which may negatively impact the performance of the network.

This disclosure contemplates a process that allows the UE to acquire the SFN before accessing a target base station/node during a RACH-less handover. The SFN may be provided to the UE in various ways. For example, the SFN may be provided as part of a handover command message (e.g., RRCReconfiguration) or a master information block (MIB). In this manner, the UE acquires the SFN before accessing the target base station/node, which allows the target base station/node and the UE to effect certain timings for the handover. For example, the target base station/node and the UE may set time bounds in which the handover must occur. As another example, different types of uplink grants may be set.

In an embodiment, a UE that is configured with a RACH-less handover or SCG change acquires the SFN value of the target cell (through PBCH/MIB acquisition) prior to accessing the target cell as part of the handover/SCG change procedure, unless the UE already has up-to-date information about the target cell SFN. The UE then acquires the MIB (e.g., SFN value) of the target cell to get timing information related to the RACH-less configuration. The UE will thus acquire the MIB of the target cell during the handover or SCG change procedure even if no random access procedure is performed there (e.g., no RACH preamble transmission or reception of Random Access Response is performed in the target cell). In NR, the 10-bit SFN value is acquired by reading the 6 most significant bits of the systemFrameNumber parameter in the MIB and the remaining 4 least significant bits are provided by 4 PBCH payload bits outside the MIB (which in the field description of the MIB in TS 38.331 is described as follows: "The 4 LSB of the SFN are conveyed in the PBCH transport block as part of channel coding (i.e. outside the MIB encoding)."). In LTE, the 10-bit SFN value is acquired by reading the 8 most significant bits of the systemFrameNumber parameter in the MIB and the remaining 2 least significant bits are provided by the scrambling of the MIB cyclic redundancy check (CRC) (e.g. by the PBCH channel coding). The target node configures the UE with validity period of the RACH-less configuration, such as for the configuration of pre-allocated UL grants or a time frame that the UE shall monitor for scheduling of UL grants in the target cell, using the target cell SFN value. This configuration is passed to the source node in the Handover Request Acknowledge message (over the Xn interface in NR or the X2 interface in LTE) and further forwarded to the UE by the source node in the RRCReconfiguration message in NR or the RRCConnectionReconfiguration message in LTE. Or, as an alternative, the target access node includes this configuration when creating the RRCReconfiguration message in NR or the RRCConnectionReconfiguration message in LTE. The target access node then passes the RRCReconfiguration message in NR or the RRCConnectionReconfiguration message in LTE to the source access node in the Handover Request Acknowledge message (over the Xn interface in NR or the X2 interface in LTE) and the message is forwarded to the UE by the source access node. The UE then uses the acquired target cell SFN value to determine the validity period of the RACH-less configuration.

In an embodiment, the target node configures the UE with a first occasion where the RACH-less configuration is valid, using a target cell SFN value. If the RACH-less configuration includes pre-allocated UL grants in the target cell, the UE considers those pre-allocated UL grants to only be valid starting from the indicated SFN value. In case of PDCCH scheduling of UL grants for Msg3 transmission in the target cell, the UE instead starts the corresponding monitoring of the PDCCH in the target cell after the indicated point in time (SFN value). The point in time when the RACH-less HO/SCG change configuration (and/or pre-allocated UL grants or monitoring of PDCCH scheduling) starts to be valid can also be defined or configured to be at a specific subframe or slot within a specific radio frame. If the UE is also configured with a handover or SCG change where the UE can receive and/or transmit to both the source cell and the target cell in parallel for some time, the information about starting point in time for the validity period of the RACH-less configuration in the target cell can be used by the UE to determine when to leave the source cell.

In an embodiment, the pre-allocated UL grants (as part of the RACH-less configuration) are configured to change characteristics at one or several points in time. This/these point(s) in time may be indicated through target cell SFN values. The characteristics can then be changed during the validity of the RACH-less configuration. Examples of characteristics that could be changed include the size of each UL grant, the modulation and coding scheme that is to be used at the transmission in the UL transmission resources allocated by the UL grant, and the periodicity of the UL grants (e.g., the time between the pre-allocated UL grants). The target node may then configure the pre-allocated UL grants to be allocated with a certain periodicity (P1), each using a certain modulation and coding scheme (MCS1), from the start of the RACH-less configuration up to a point in time indicated through SFNx and then configure the pre-allocated UL grants to be allocated with another periodicity (P2), each using a different modulation and coding scheme (MCS2), after that. A variation of plain periodic UL grants can be to use a periodic pattern, e.g. two back-to-back UL grants (or two UL grants with a short gap in between) followed by a long gap and then this pattern is repeated periodically. Again, the periodicity can change at different points during the validity/handover/SCG change period and the pattern may change too, for example, between plain periodic UL grants and various patterns, for example including two or three densely allocated UL grants followed by a longer gap. A reason for allocating UL grants in dense groups with longer gaps between the groups may be to adapt to switches between UL and DL operation in a TDD system. If UL grants are not pre-allocated, but allocated via the PDCCH in the target cell, then the above described solution characteristics, for example change of periodicity at certain preconfigured points in time (indicated by the target cell SFN and possibly subframe/slot number) and/or change of time pattern, will apply to PDCCH monitoring occasions instead of pre-allocated UL grants, e.g., constituting points in time (subframes/slots/symbols) where the UE should monitor the PDCCH in the target cell.

As an alternative, the change in characteristics during the validity period of the RACH-less configuration can also include a change in power level that the UE uses (or can use) when it is transmitting in the pre-allocated or scheduled UL grants. As an example, the UE can be configured to use a certain power level in its first transmission(s) and, in case the transmissions are not successful it can use a higher power level in later transmission (if such are needed). The changes in power level may be defined or configured to take place at specific points in time, based on SFN, subframe, and/or slot values, or after a defined or configured number of unsuccessful transmissions. The changes in power level can also follow a pattern that is defined or configured. As an example, the UE increases the used power level in different steps between subsequent transmissions in the UL grants. The increase in power level may then be defined or configured to take place after an unsuccessful transmissions in the UL grants, or after a time t without a successful transmission in the UL grants.

In an embodiment, the target node indicates to the UE at what point in time the RACH-less configuration is no longer valid in the target cell, using a target cell SFN value. The point in time where the RACH-less configuration is no longer valid can also be defined or configured to be at a specific subframe or slot within a specific radio frame. After the point in time where the RACH-less configuration is defined/configured to be no longer valid, the UE does not consider the corresponding pre-allocated UL grants (if configured) to be valid any longer. In case of PDCCH scheduling of UL grants for Msg3 transmission in the target cell, the UE instead stops the corresponding monitoring of the PDCCH. If the handover or SCG change procedure has not yet ended (e.g., timer T304 or T307, respectively, has not yet expired), the UE can perform the RACH procedure in the target cell (e.g., fall back to regular RACH-based handover/SCG change). A similar fallback to using the RACH procedure in case the RACH-less access is not successful lets the pre-allocated UL grants be valid until a point in time that is indicated to the UE as (or derived by the UE from) a source cell SFN value. These and other embodiments will be described in more detail using FIGS. 1-12.

FIG. 1 is an illustration of an exemplary wireless network, in accordance with certain embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
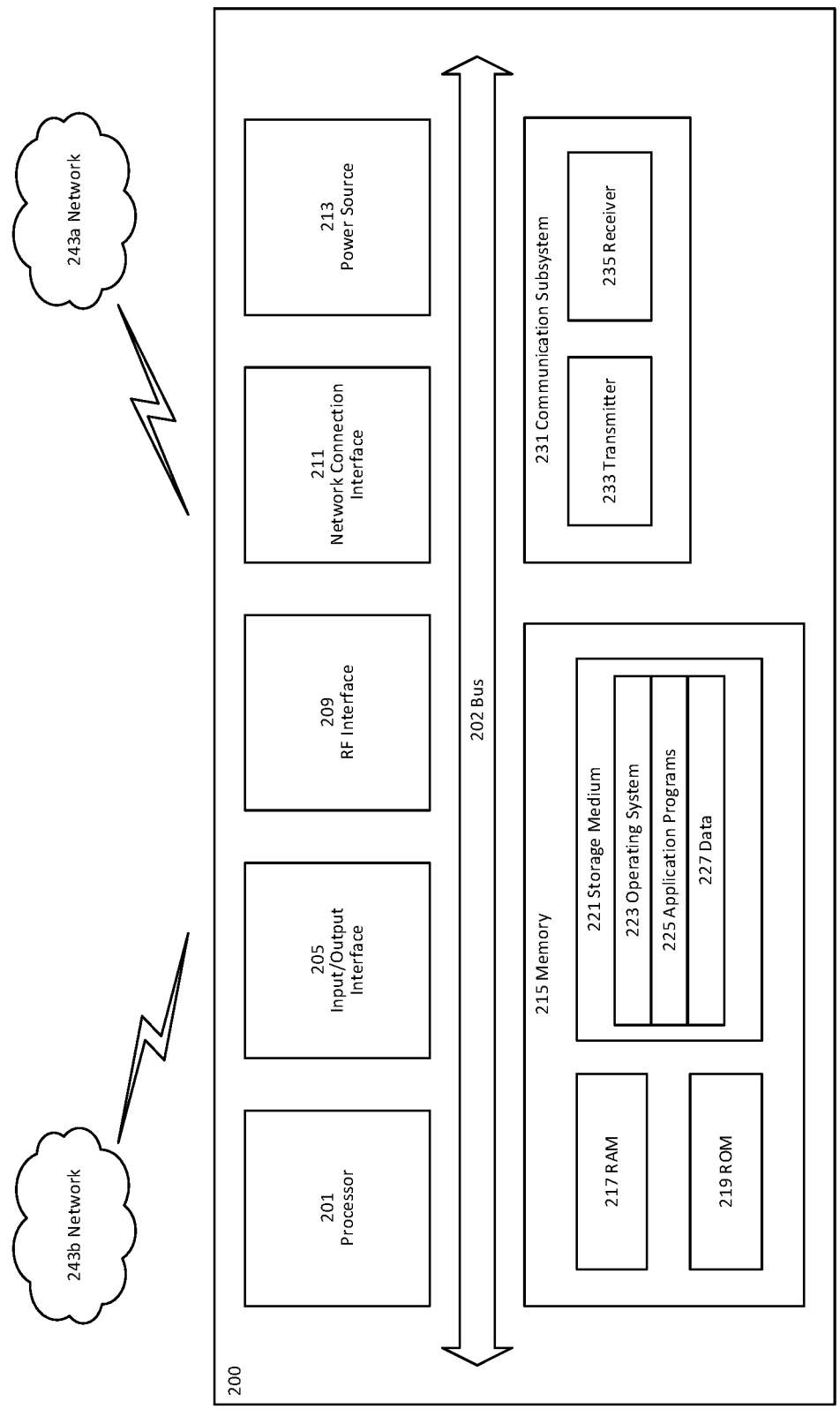
FIG. 2 is an illustration of an exemplary user equipment, in accordance with certain embodiments.

FIG. 2 is an illustration of an exemplary user equipment, in accordance with certain embodiments. FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
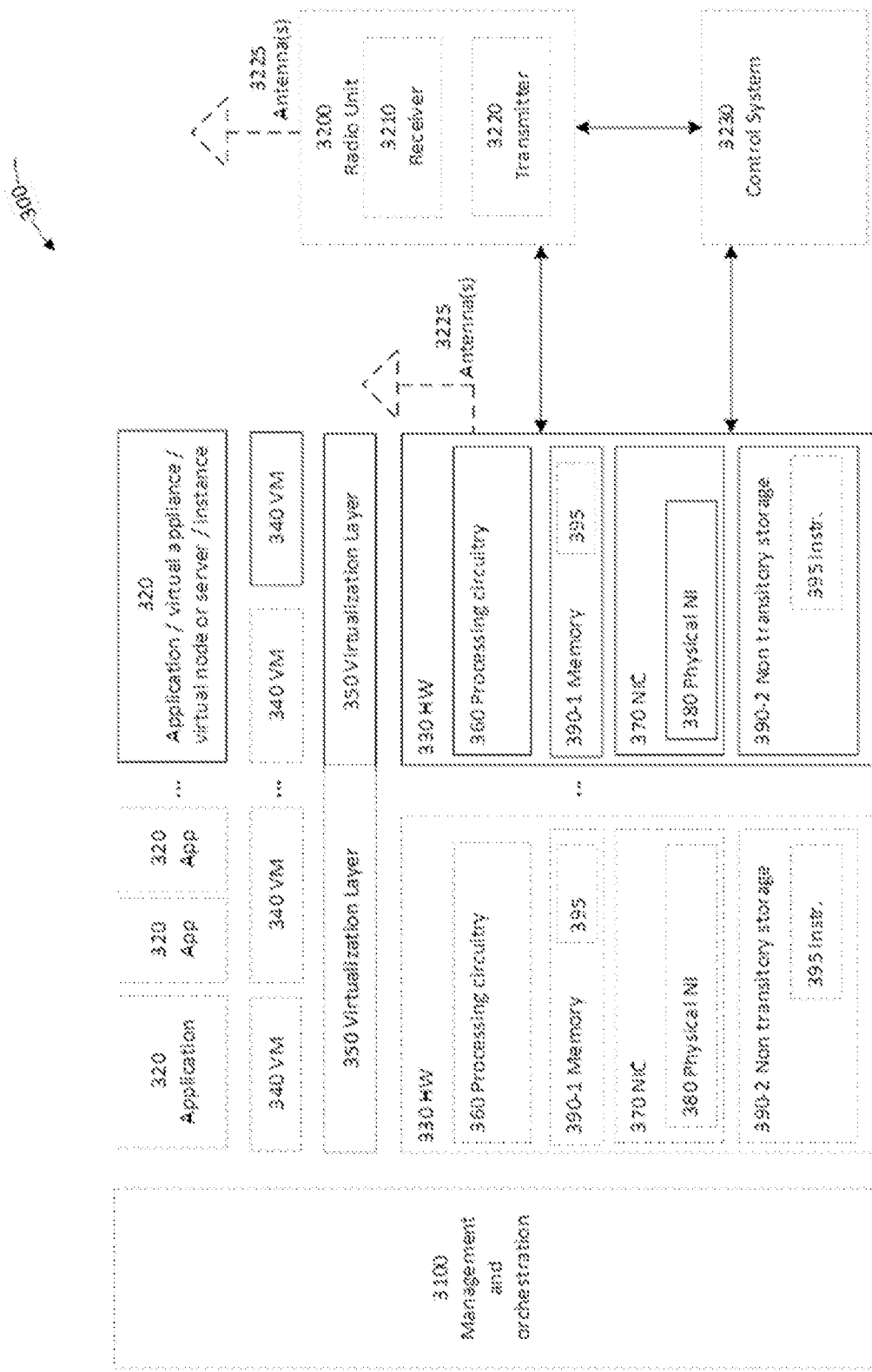
FIG. 3 is an illustration of an exemplary virtualization environment, in accordance with certain embodiments.

FIG. 3 is an illustration of an exemplary virtualization environment, in accordance with certain embodiments. FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 4:
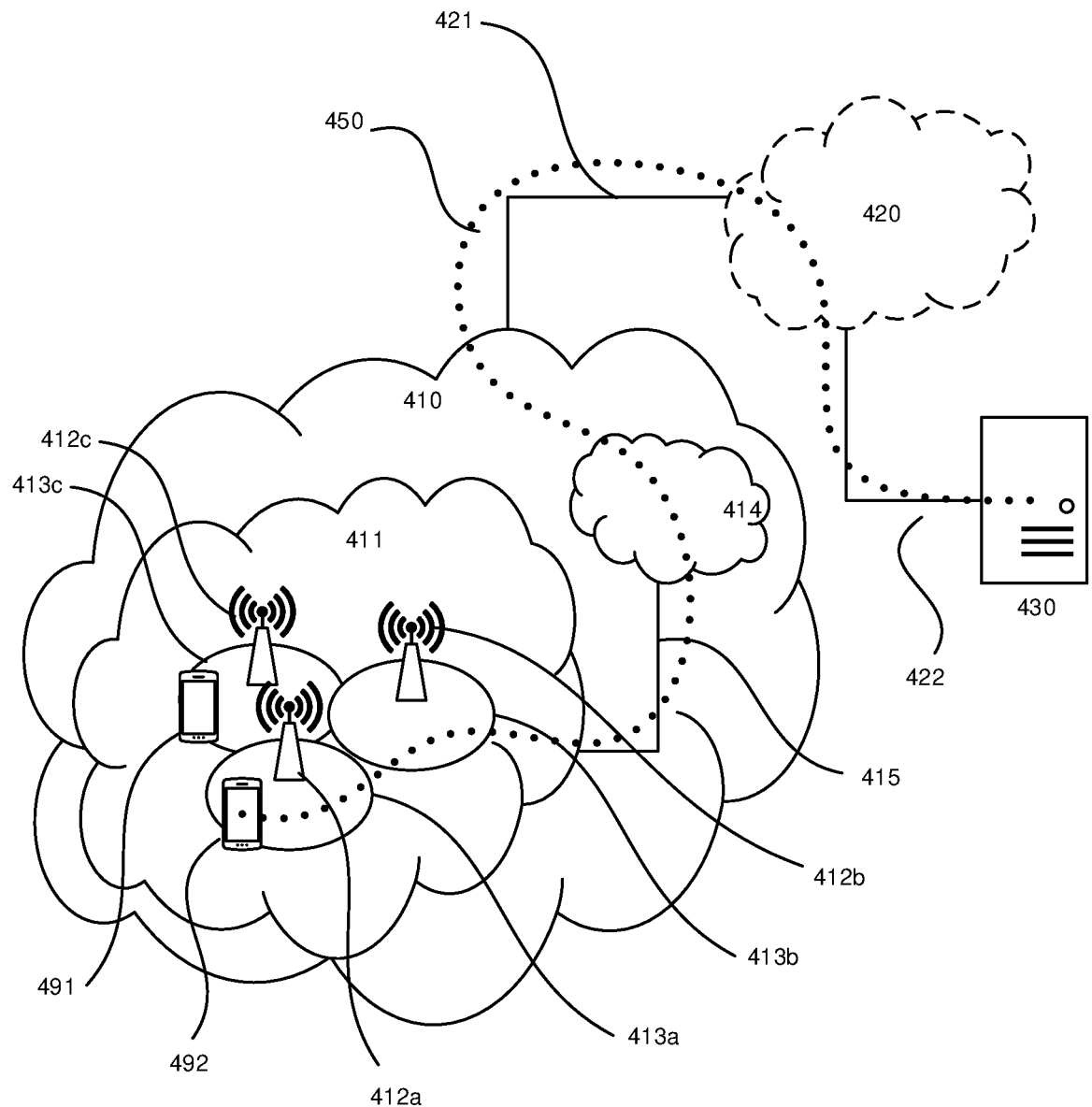
FIG. 4 is an illustration of an exemplary telecommunication network connected via an intermediate network to a host computer, in accordance with certain embodiments.

FIG. 4 is an illustration of an exemplary telecommunication network connected via an intermediate network to a host computer, in accordance with certain embodiments. With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 5:
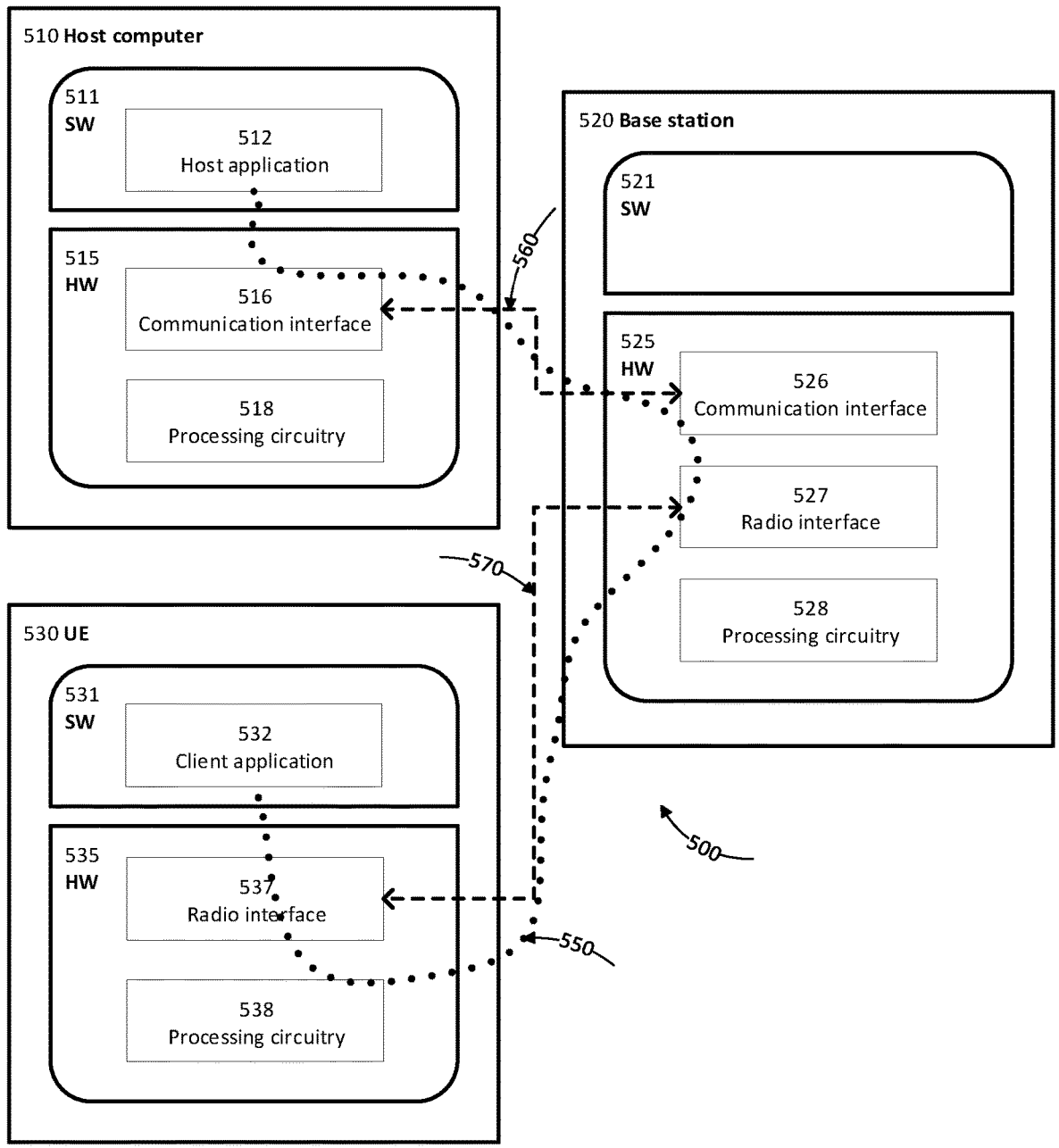
FIG. 5 is an illustration of an exemplary host computer communicating via a base station with a user equipment over a partially wireless connection, in accordance with certain embodiments.

FIG. 5 is an illustration of an exemplary host computer communicating via a base station with a user equipment over a partially wireless connection, in accordance with certain embodiments. Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the handover capability of user devices and thereby provide benefits such as increased network resource availability during and after handovers, reduced delay associated with handover, and more efficient network resource usage during handovers.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both.

In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
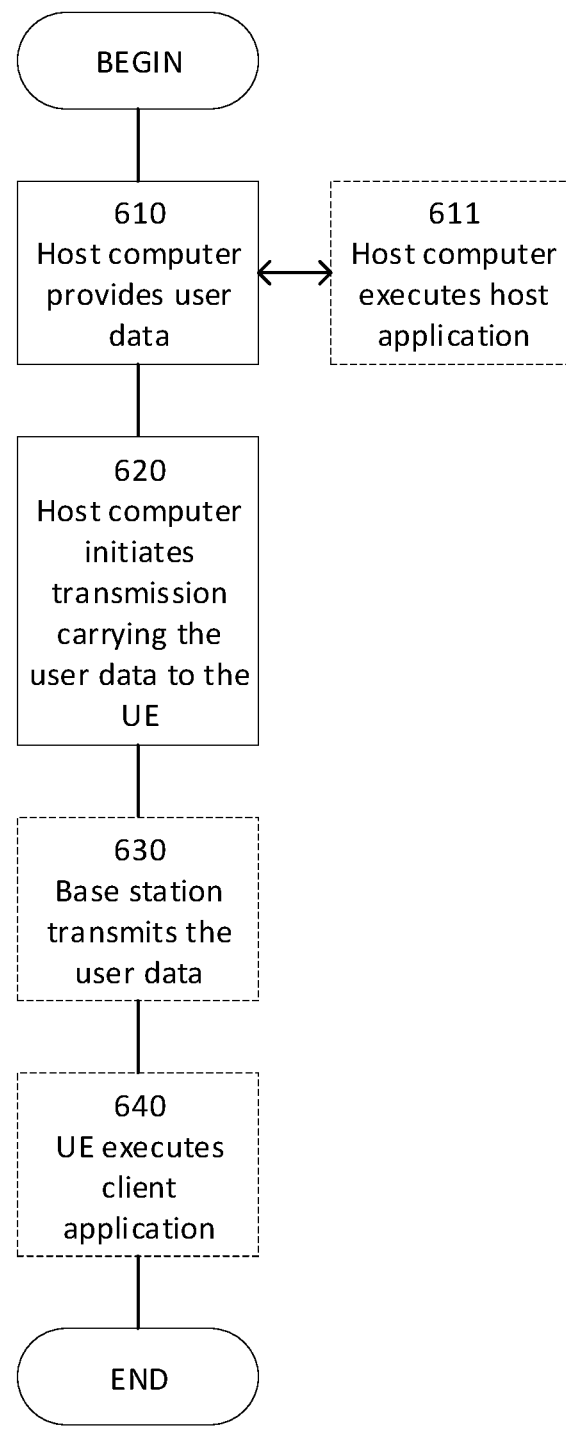
FIGS. 6-9 are flowcharts showing exemplary methods implemented in a communication system including a host computer, a base station and a user equipment, in accordance with certain embodiments.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
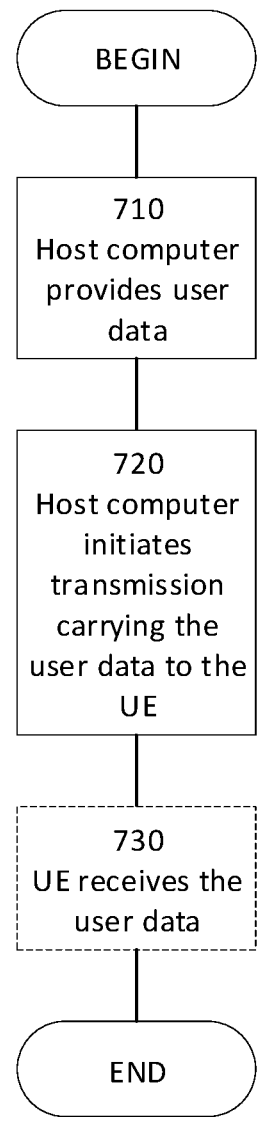

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
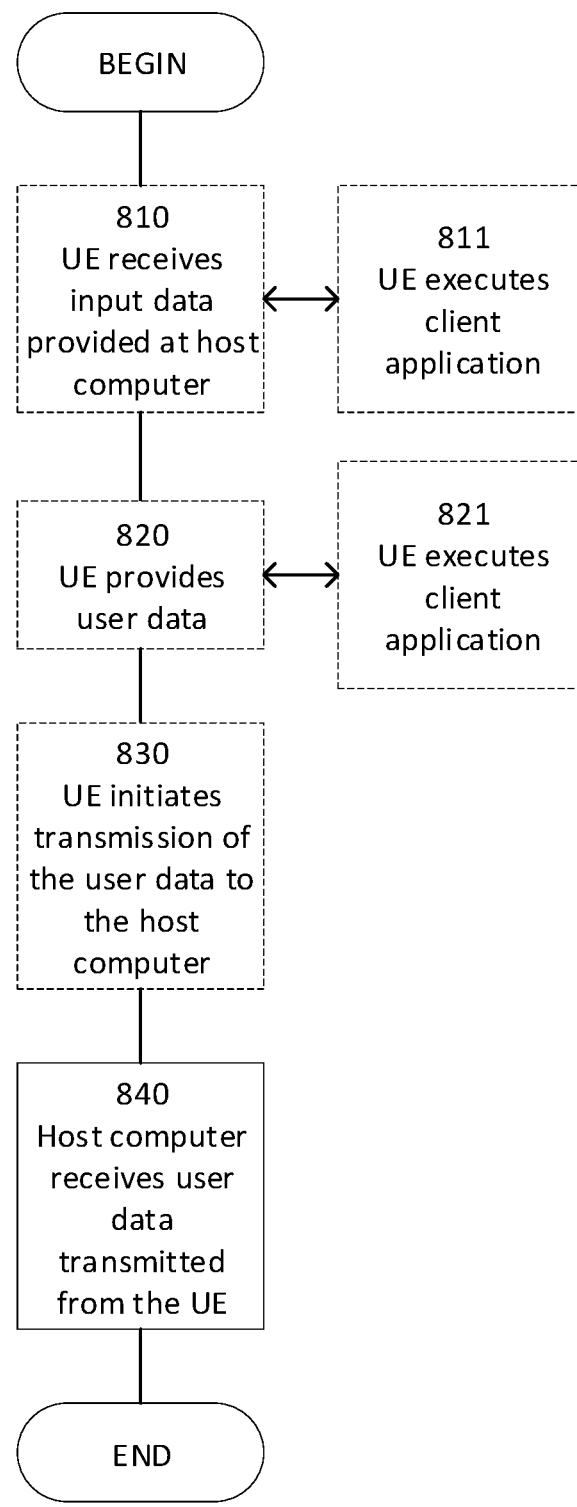

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
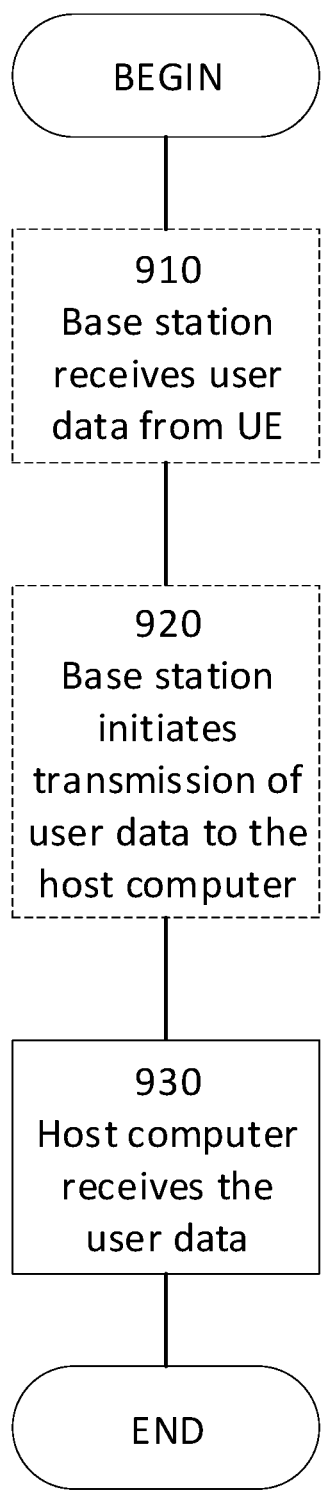

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 10:
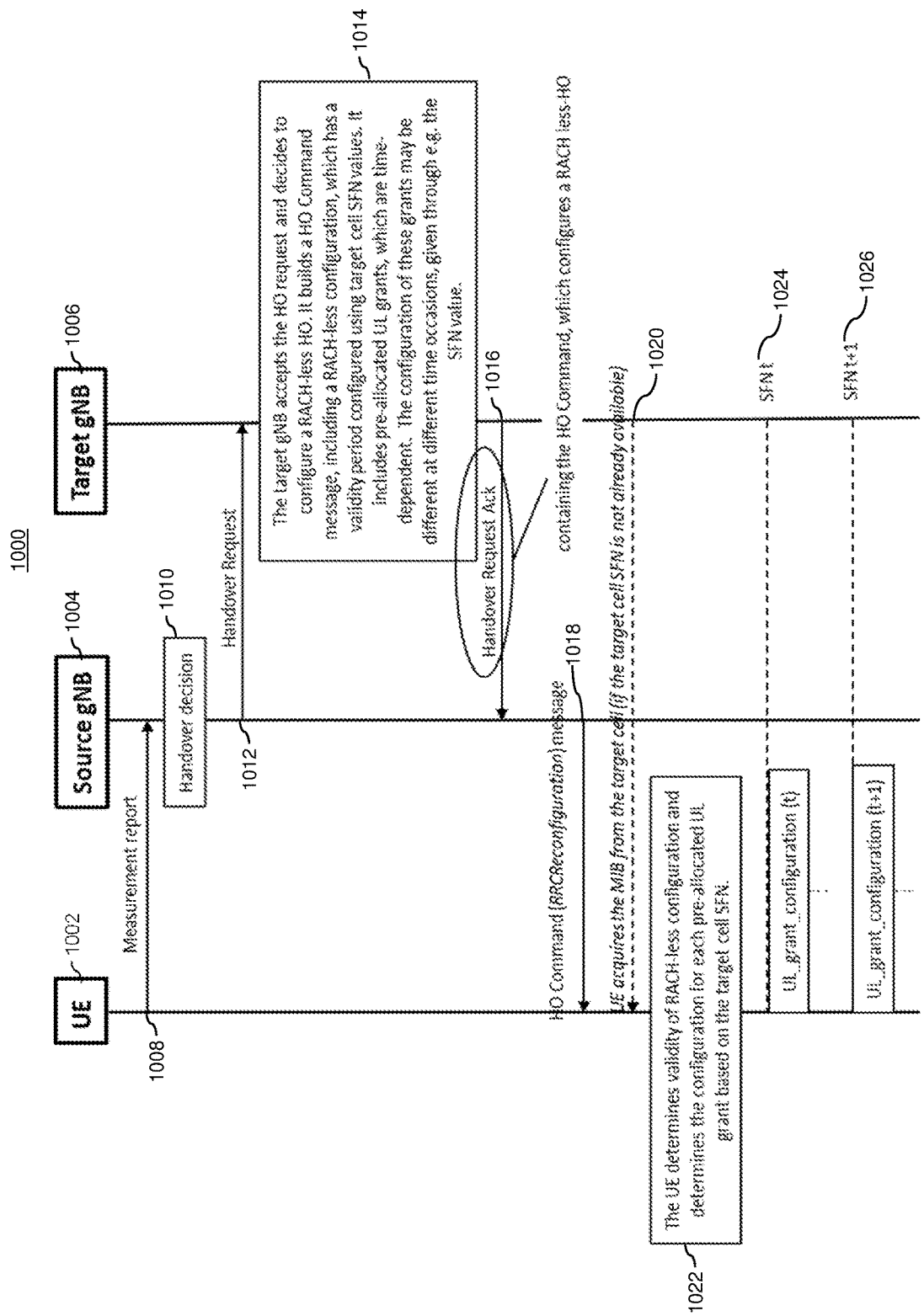
FIG. 10 is a flowchart showing an exemplary process for performing RACH-less handover, in accordance with certain embodiments.

FIG. 10 illustrates an example process 1000 for performing RACH-less handover. A UE 1002 begins by communicating a measurement report to a source network node (e.g., gNB) 1004 in step 1008. The measurement report may indicate any number of measurements performed by the UE 1002, such as for example, signal strength. The source node 1004 makes a handover decision based on the measurement report in step 1010. For example, if the measurement report indicates that the UE 1002 would be better served if it connected to the network through another network node (e.g., target node/gNB 1006), then source gNB 1004 communicates a handover request to that network node (e.g., target node/gNB 1006) in step 1012. The target node 1006 accepts the handover request and may decide to configure a RACH-less handover in step 1014. The target node 1006 then builds a handover command message that includes a RACH-less configuration, which has a validity period configured using SFN value(s) for the target cell 1006, in step 1014. The message may also include pre-allocated UL grants, which are time-dependent. The configuration of these grants may be different at different time occasions, given through, for example, the SFN value(s).

The target node 1006 communicates a handover request acknowledgement to the source node 1004 in step 1016. This acknowledgement includes the handover command message, which configures a RACH-less handover. The source node 1004 then communicates a handover command message (e.g., RRCReconfiguration) to the UE 1002 in step 1018. The UE 1002 acquires the MIB from the target cell 1006 if the target cell 1006 SFN is not already available in step 1020. The UE 1002 then determines the validity of the RACH-less configuration and determines the configuration for each pre-allocated UL grant based on the target cell 1006 SFN in step 1022. The UE 1002 and target node 1006 then communicate UL_grant_configuration(s) to one another in subsequent steps (e.g., steps 1024 and 1026).

Figure 11:
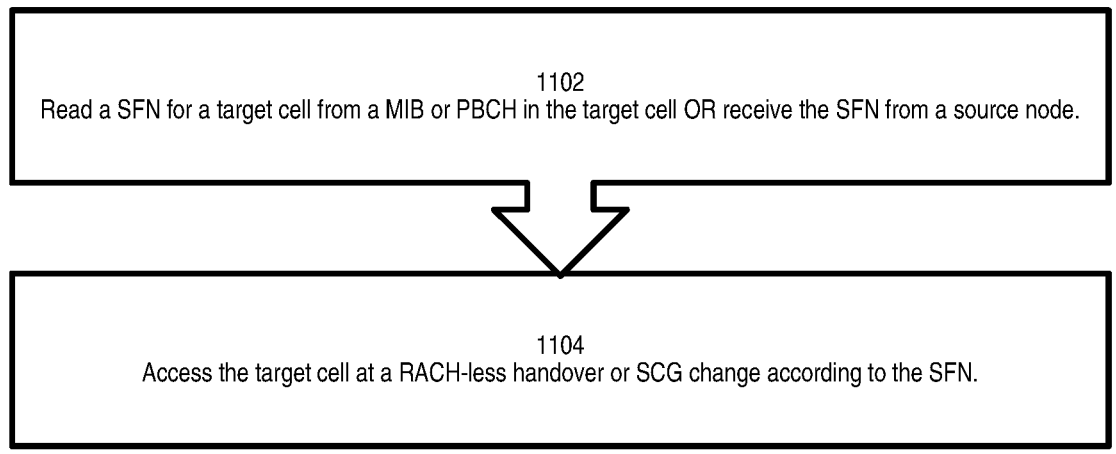
FIG. 11 is a flowchart showing an exemplary method, in accordance with certain embodiments.

FIG. 11 is a flowchart showing an exemplary method, in accordance with certain embodiments. The method begins at step 1102 with a UE reading an SFN for a target cell from a MIB or PBCH in the target cell OR receiving the SFN from a source node. In step 1104, the UE accesses the target cell at a RACH-less handover or SCG change according to the SFN. In this manner, RACH-less handover or SCG change can be accomplished necessarily pre-allocating or scheduling UL grants to the UE prior to the handover.

Figure 12:
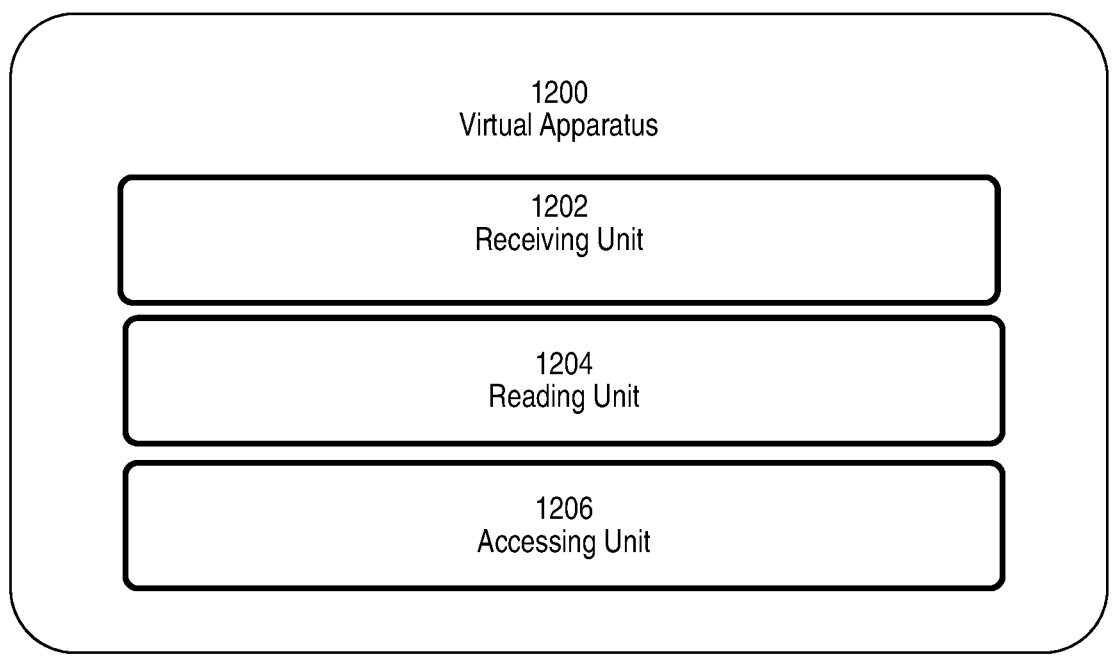
FIG. 12 is an illustration of an exemplary virtualization apparatus, in accordance with certain embodiments.

FIG. 12 illustrates a schematic block diagram of an apparatus 2200 in a wireless network (for example, the wireless network shown in FIG. 1). The apparatus may be implemented in a wireless device or network node (e.g., wireless device 110 or network node 160 shown in FIG. 1). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1202, reading unit 1204, and accessing unit 1206, and any other suitable units of apparatus 1200 to perform corresponding functions according one or more embodiments of the present disclosure.

As illustrated in FIG. 12, apparatus 1200 includes receiving unit 1202, reading unit 1204, and accessing unit 1206. Receiving unit 1202 is configured to receive messages from a network (e.g., source and target nodes/cells). Reading unit 1204 is configured to read an SFN value for a target cell from a received message. Accessing unit 1206 is configured to accesses the target cell at a RACH-less handover or SCG change according to the SFN.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
AMF Access and Mobility Management Function
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GPS Global Positioning System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCS Modulation and Coding Scheme MDT Minimization of Drive Tests
MIB Master Information Block
MME Mobility Management Entity
MSC Mobile Switching Center
Msg Message
NPDCCH Narrowband Physical Downlink Control Channel
NR New Radio
NTP Network Time Protocol
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSCell Primary Secondary Cell
PSS Primary Synchronization Signal
PUCCH Physical Uplink Control Channel
PUSCH Physical Uplink Shared Channel
QAM Quadrature Amplitude Modulation
RACH Random Access Channel
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCell Secondary Cell
SCG Secondary Cell Group
SCH Synchronization Channel
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TA Timing Advance
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
X2 The interface/reference point between two eNBs
Xn The interface/reference point between two gNBs

The invention claimed is:

1. A method performed by a user equipment (UE) for performing Random Access Channel (RACH)-less handover or Secondary Cell Group (SCG) change, the method comprising:
receiving a message;
reading a System Frame Number (SNF) for a target cell from the message;
based on the SFN number, performing one or more of the following:
changing a transmit power;
determining a change in size of a pre-allocated uplink (UK) grant;
determining a change in periodicity of a pre-allocated UL grant; and
changing a modulation and coding scheme; and
accessing the target cell during a RACH-less handover or SCG change according to the SFN.

2. The method of claim 1, further comprising determining a validity of a RACH-less configuration using the SFN.

3. The method of claim 1, wherein the message is a handover command message generated by a base station controlling the target cell.

4. The method of claim 1, wherein the message is a master information block acquired from the target cell.

5. A user equipment (UE) for performing Random Access Channel (RACH)-less handover or Secondary Cell Group (SCG) change, the UE comprising:
power supply circuitry configured to supply power to the UE; and
processing circuitry configured to perform any of the steps of claim 1.

6. A user equipment (UE) for performing RACH-less handover or SCG change, the UE comprising:
an antenna configured to send and receive wireless signals;
radio front-end circuitry connected to the antenna and to processing circuitry, and configured to condition signals communicated between the antenna and the processing circuitry;
an input interface connected to the processing circuitry and configured to allow input of information into the UE to be processed by the processing circuitry;
an output interface connected to the processing circuitry and configured to output information from the UE that has been processed by the processing circuitry;
a battery connected to the processing circuitry and configured to supply power to the UE; and
the processing circuitry being configured to perform the steps of claim 1.

7. A method performed by a base station for performing Random Access Channel (RACH)-less handover or Secondary Cell Group (SCG) change, the method comprising:

configuring a user equipment (UE) using a target cell System Frame Number (SFN) value prior to the UE performing RACH-less handover or SCG change to the target cell;

wherein based on the SFN value:
- a transmit power is changed;
- a change in size of a pre-allocated uplink (UL) grant is determined;
- a change in periodicity of a pre-allocated UL grant is determined; or
- a modulation and coding scheme is changed; and detecting access by the UE according to the SFN value.

8. The method of claim 7, wherein a validity of a RACH-less configuration is determined using the SFN.

9. The method of claim 7, further comprising generating a message containing the SFN, the message is conveyed to the UE prior to the UE accessing the target cell.

10. The method of claim 9, wherein the message is a handover command.

11. The method of claim 9, wherein the message is a master information block transmitted in the target cell.

12. A base station for performing Random Access Channel (RACH)-less handover or Secondary Cell Group (SCG) change, the base station comprising:
- power supply circuitry configured to supply power to the base station; and
- processing circuitry configured to perform any of the steps of claim 7.

* * * * *